(12) United States Patent
Griffith

(10) Patent No.: US 10,431,104 B2
(45) Date of Patent: *Oct. 1, 2019

(54) AIRCRAFT COLLISION AVOIDANCE SYSTEM

(71) Applicant: Gregory M. Griffith, Holland, MI (US)

(72) Inventor: Gregory M. Griffith, Holland, MI (US)

(73) Assignee: Wingguard, LLC, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,843

(22) Filed: Jul. 3, 2018

(65) Prior Publication Data
US 2019/0019424 A1 Jan. 17, 2019

Related U.S. Application Data

(63) Continuation of application No. 15/064,138, filed on Mar. 8, 2016, now Pat. No. 10,013,888, which is a continuation-in-part of application No. 14/457,040, filed on Aug. 11, 2014, now abandoned, which is a continuation of application No. 13/608,678, filed on Sep. 10, 2012, now Pat. No. 8,803,710, which is a continuation of application No. 12/396,015, filed on Mar. 2, 2009, now Pat. No. 8,264,377.

(51) Int. Cl.
| | |
|---|---|
| *G08G 5/04* | (2006.01) |
| *G01S 13/93* | (2006.01) |
| *B64F 1/22* | (2006.01) |
| *G01S 13/86* | (2006.01) |
| *G08B 3/10* | (2006.01) |
| *G08G 5/06* | (2006.01) |

(52) U.S. Cl.
CPC ............ *G08G 5/045* (2013.01); *B64F 1/228* (2013.01); *G01S 13/86* (2013.01); *G01S 13/931* (2013.01); *G08B 3/10* (2013.01); *G08G 5/04* (2013.01); *G08G 5/065* (2013.01); *G01S 2013/936* (2013.01); *G01S 2013/9335* (2013.01)

(58) Field of Classification Search
CPC ......... B64D 3/02; G01S 13/931; G01S 13/91; G08G 5/04
See application file for complete search history.

(56) References Cited

U.S. PATENT DOCUMENTS

| | | |
|---|---|---|
| 1,648,463 A | 11/1927 | Rohrbach |
| 2,934,755 A | 4/1960 | Canada |
| 2,938,192 A | 5/1960 | Adler, Jr. |
| 3,053,932 A | 9/1962 | Worst |
| 3,149,196 A | 9/1964 | Roth |
| 3,235,838 A | 2/1966 | Hilt |
| 3,455,272 A | 7/1969 | Zeller |

(Continued)

OTHER PUBLICATIONS

PCT Written Opinion of the International Searching Authority for International Application No. PCT/US10/00621 dated Oct. 27, 2010.

*Primary Examiner* — Phung Nguyen
(74) *Attorney, Agent, or Firm* — King & Partners, PLC

(57) ABSTRACT

An aircraft collision avoidance system including (a) at least one separation monitoring device connectable to at least a portion of an aircraft and/or vehicle, the separation monitoring device comprising (1) at least one transmitter, (2) at least one receiver, and (3) an image sensor, and (b) a master unit.

16 Claims, 5 Drawing Sheets

(56) References Cited

U.S. PATENT DOCUMENTS

| | | |
|---|---|---|
| 3,579,238 A | 5/1971 | Haeff et al. |
| 3,690,767 A | 9/1972 | Missio et al. |
| 3,710,311 A | 1/1973 | Avital |
| 3,733,604 A | 5/1973 | Smith |
| 3,739,379 A | 6/1973 | Davis |
| 3,765,770 A | 10/1973 | McConnell et al. |
| 3,803,614 A | 4/1974 | Reid |
| 3,872,474 A | 3/1975 | Levine |
| 3,985,030 A | 10/1976 | Charlton |
| 4,001,499 A | 1/1977 | Dowell |
| 4,044,354 A | 8/1977 | Bosher et al. |
| 4,066,890 A | 1/1978 | Hamilton et al. |
| 4,071,843 A | 1/1978 | Marien |
| 4,115,841 A | 9/1978 | Alexander |
| 4,139,848 A | 2/1979 | Maxwell et al. |
| 4,152,693 A | 5/1979 | Ashworth, Jr. |
| 4,225,866 A | 9/1980 | Levine |
| 4,233,652 A | 11/1980 | Oswald |
| 4,277,170 A | 7/1981 | Miles |
| 4,319,246 A | 3/1982 | Fitz |
| 4,322,726 A | 3/1982 | Collier et al. |
| 4,336,538 A | 6/1982 | Radford |
| 4,355,348 A | 10/1982 | Williams |
| 4,367,514 A | 1/1983 | Large et al. |
| 4,405,205 A | 9/1983 | Rossmann |
| 4,445,132 A | 4/1984 | Ichikawa et al. |
| 4,445,185 A | 4/1984 | Davis, Jr. et al. |
| 4,465,367 A | 8/1984 | Sabatier |
| 4,495,549 A | 1/1985 | Carlson et al. |
| 4,527,158 A | 7/1985 | Runnels |
| 4,528,564 A | 7/1985 | Trampnau |
| 4,531,408 A | 7/1985 | Chadwick et al. |
| 4,552,376 A | 11/1985 | Cofer |
| 4,581,762 A | 4/1986 | Lapidus et al. |
| 4,602,336 A | 7/1986 | Brown |
| 4,633,376 A | 12/1986 | Newman |
| 4,635,203 A | 1/1987 | Merchant |
| 4,678,329 A | 7/1987 | Lukowski, Jr. et al. |
| 4,684,247 A | 8/1987 | Hammill, III |
| 4,688,046 A | 8/1987 | Schwab |
| 4,695,013 A | 9/1987 | Trampnau |
| 4,695,959 A | 9/1987 | Lees et al. |
| 4,713,669 A | 12/1987 | Shuch |
| 4,727,311 A | 2/1988 | Walker |
| 4,731,663 A | 3/1988 | Kovalchick et al. |
| 4,758,839 A | 7/1988 | Goebel et al. |
| 4,779,095 A | 10/1988 | Guerreri |
| 4,792,904 A | 12/1988 | Reinagel et al. |
| 4,799,267 A | 1/1989 | Kamejima et al. |
| 4,805,015 A | 2/1989 | Copeland |
| 4,805,453 A | 2/1989 | Haynes |
| 4,816,828 A | 3/1989 | Feher |
| 4,916,445 A | 4/1990 | Crossley |
| 4,918,442 A | 4/1990 | Bogart, Jr. |
| 5,030,946 A | 7/1991 | Yamamura |
| 5,063,462 A | 11/1991 | Nakagawa et al. |
| 5,184,114 A | 2/1993 | Brown |
| 5,225,819 A | 7/1993 | Hosotani et al. |
| 5,233,337 A | 8/1993 | Takahashi |
| 5,285,205 A | 2/1994 | White |
| 5,296,854 A | 3/1994 | Hamilton et al. |
| 5,315,296 A | 5/1994 | Kaiser et al. |
| 5,343,295 A | 8/1994 | Lara et al. |
| 5,406,395 A | 4/1995 | Wilson et al. |
| 5,410,328 A | 4/1995 | Yoksza et al. |
| 5,420,482 A | 5/1995 | Phares |
| 5,436,535 A | 7/1995 | Yang |
| 5,508,721 A | 4/1996 | Hattori |
| 5,581,250 A | 12/1996 | Khvilivitzky |
| 5,601,353 A | 2/1997 | Naimark et al. |
| 5,621,282 A | 4/1997 | Haskell |
| 5,646,783 A | 7/1997 | Banbury |
| 5,647,016 A | 7/1997 | Takeyama |
| 5,712,650 A | 1/1998 | Barlow |
| 5,717,392 A | 2/1998 | Eldridge |
| 5,719,568 A | 2/1998 | Adams |
| 5,734,336 A * | 3/1998 | Smithline ............ B60Q 9/008 180/168 |
| 5,734,361 A | 3/1998 | Suzuki et al. |
| 5,780,321 A | 7/1998 | Shieh |
| 5,789,766 A | 8/1998 | Huang et al. |
| 5,812,105 A | 9/1998 | Van de Ven |
| 5,815,411 A | 9/1998 | Ellenby et al. |
| 5,818,404 A | 10/1998 | Lebby et al. |
| 5,827,753 A | 10/1998 | Huang et al. |
| 5,898,401 A | 4/1999 | Walls |
| 5,945,789 A | 8/1999 | Chou |
| 5,977,960 A | 11/1999 | Nally et al. |
| 5,982,299 A | 11/1999 | Shemwell |
| 5,990,506 A | 11/1999 | Fossum et al. |
| 6,011,493 A | 1/2000 | Bushell et al. |
| 6,046,689 A | 4/2000 | Newman |
| 6,100,921 A | 8/2000 | Rowley |
| 6,118,401 A * | 9/2000 | Tognazzini ............ G01S 7/04 342/29 |
| 6,127,668 A | 10/2000 | Baek |
| 6,130,636 A | 10/2000 | Severwright |
| 6,150,938 A | 11/2000 | Sower et al. |
| 6,178,650 B1 | 1/2001 | Thibodeaux |
| 6,211,808 B1 | 4/2001 | Rees |
| 6,222,457 B1 | 4/2001 | Mills et al. |
| 6,235,549 B1 | 5/2001 | Bawolek et al. |
| 6,246,320 B1 | 6/2001 | Monroe |
| 6,252,497 B1 | 6/2001 | Dupay et al. |
| 6,275,773 B1 | 8/2001 | Lemelson et al. |
| 6,278,382 B1 | 8/2001 | DeMarco et al. |
| 6,359,323 B1 | 3/2002 | Eom et al. |
| 6,366,212 B1 | 4/2002 | Lemp |
| 6,369,417 B1 | 4/2002 | Lee |
| 6,369,942 B1 | 4/2002 | Hedrick et al. |
| 6,379,992 B2 | 4/2002 | Jo |
| 6,386,572 B1 | 5/2002 | Cofer |
| 6,388,748 B1 | 5/2002 | Kokura |
| 6,429,420 B1 | 8/2002 | Babst et al. |
| 6,439,752 B1 | 8/2002 | Petrick |
| 6,486,798 B2 | 11/2002 | Rast |
| 6,486,913 B1 | 11/2002 | Afghahi et al. |
| 6,765,276 B2 | 7/2004 | Fasen et al. |
| 6,872,584 B2 | 3/2005 | Nakashiba |
| 6,909,381 B2 | 6/2005 | Kahn |
| 6,963,293 B1 | 11/2005 | Rast |
| 6,995,662 B2 | 2/2006 | Wortsmith |
| 7,129,979 B1 | 10/2006 | Lee |
| 7,269,493 B2 | 9/2007 | Uemura et al. |
| 7,292,209 B2 | 11/2007 | Rast |
| 7,983,836 B2 * | 7/2011 | Breed .................. G08G 1/161 340/441 |
| 8,803,710 B2 | 8/2014 | Griffith |
| 10,013,888 B2 | 7/2018 | Griffith |
| 2004/0147059 A1 | 7/2004 | Jeong et al. |
| 2005/0007257 A1 | 1/2005 | Rast |
| 2005/0090035 A1 | 4/2005 | Kim |
| 2005/0263839 A1 | 12/2005 | Suzuki |
| 2006/0011813 A1 | 1/2006 | Park et al. |
| 2006/0043261 A1 | 3/2006 | Matsuda et al. |
| 2006/0138500 A1 | 6/2006 | Kim |
| 2006/0157761 A1 | 7/2006 | Park et al. |
| 2006/0261342 A1 | 11/2006 | Wells |
| 2006/0287829 A1 * | 12/2006 | Pashko-Paschenko ..................... B60Q 5/006 701/301 |
| 2007/0023802 A1 | 2/2007 | Oh et al. |
| 2007/0090274 A1 | 4/2007 | Lee et al. |
| 2007/0187793 A1 | 8/2007 | Moon et al. |
| 2008/0062011 A1 * | 3/2008 | Butler .................. G01S 3/783 340/961 |
| 2008/0083851 A1 | 4/2008 | Perry et al. |

* cited by examiner

AIRCRAFT COLLISION AVOIDANCE SYSTEM

CROSS-REFERENCE TO RELATED APPLICATION(S)

This application is a continuation of U.S. application Ser. No. 15/064,138, filed Mar. 8, 2016, entitled "Aircraft Collision Avoidance System," now U.S. Pat. No. 10,013,888, which is a continuation-in-part of U.S. application Ser. No. 14/457,040, filed Aug. 11, 2014, entitled "Aircraft Collision Avoidance System" which is a continuation of U.S. application Ser. No. 13/608,678, filed Sep. 10, 2012, now U.S. Pat. No. 8,803,710, entitled "Aircraft Collision Avoidance System" which is a continuation of U.S. application Ser. No. 12/396,015, filed Mar. 2, 2009, now U.S. Pat. No. 8,264,377, entitled "Aircraft Collision Avoidance System"—all of which are hereby incorporated herein by reference in their entirety, including all references cited therein.

BACKGROUND OF THE INVENTION

1. Field of the Invention

The present invention relates in general to aircraft collision avoidance systems and, more particularly, to an aircraft collision avoidance system which is designed to minimize and/or eliminate damage to an aircraft during ground transportation of the same to and/or from, for example, a hangar or other facility.

2. Background Art

Collision avoidance systems have been known in the aviation industry for years. While collision avoidance systems have been known in the art, issues relative to system portability and multi-aircraft usability remain largely problematic.

Aircraft are typically stored in hangars or outside along other aircraft. A common problem in transporting aircraft from a hangar to the tarmac, and vice-versa, is a phenomenon known as "hangar rash." Hangar rash is caused by improper ground handling of an aircraft and commonly occurs when the aircraft is being pushed or pulled from the hanger by a vehicle, such as a tractor. An inattentive or careless tractor operator may inadvertently cause a wing, horizontal stabilizer, and/or vertical stabilizer of the aircraft to contact, for example, another aircraft, a hanger wall, and/or a hanger door—causing extremely expensive and potentially catastrophic damage to the aircraft.

Some aircraft are provided with collision warning devices fabricated into the wings, stabilizers and/or nose cones of the aircraft. These devices suffer from numerous drawbacks including, but not limited to, the fact that the devices are integral instruments of the aircraft. Typically, this means that an individual operating the collision warning device must possess required FAA certifications which are necessary to legally operate the plane itself in order to operate the collision warning devices.

Thus the need exists for an aircraft collision avoidance system, which is portable and facilitates rapid installation, removal, and use of the collision avoidance system toward multi-aircraft utilization and avoidance of strict FAA certifications associated with collision avoidance systems which are fully integrated into an aircraft.

SUMMARY OF THE INVENTION

In one embodiment the present invention is directed to an aircraft collision avoidance system comprising: (a) at least one separation monitoring device connectable to at least a portion of an aircraft, the separation monitoring device comprising: (1) at least one transmitter capable of selectively transmitting signals which are reflected off of an object and received by at least one receiver, the reflected signals defining a separation distance between the at least one receiver and the object and wherein the at least one transmitter outputs a separation distance signal representative of the separation distance; and (2) an optional image sensor preferably in communication with a master unit; and (b) a master unit for receiving and analyzing the separation distance signals output by the at least one transmitter and outputting a warning signal to a warning device when the at least one separation monitoring device is within a predetermined distance from the object.

In another embodiment the present invention is directed to an aircraft collision avoidance system, comprising: (a) at least one wireless transceiver capable of selectively transmitting signals and receiving signals which are reflected back to the wireless transceiver off of an object in order to define a separation distance between the wireless transceiver and the object and wherein the wireless transceiver outputs a separation distance signal representative of the separation distance; and (b) a master unit for receiving and analyzing the separation distance signals output by the wireless transceiver, the master unit outputting a warning signal to a warning device when the wireless transceiver is within a predetermined distance from an object.

In yet another embodiment, a separation monitoring device is disposed on at least one of a wing and a horizontal stabilizer of an aircraft and the master unit communicates with the separation monitoring device to monitor the position of at least one of the wing and the horizontal stabilizer of the aircraft relative to an object.

In a preferred embodiment the at least one separation monitoring device is connected to at least a portion of at least one of a wing and a horizontal stabilizer of an aircraft, wherein the at least one separation monitoring device transmits signals in an arcuate pattern both horizontally and substantially co-planar to at least one of the wing and the horizontal stabilizer and receives signals reflected off of an object and outputs a separation distance signal representing the separation distance between the object and the at least one separation monitoring device.

In another embodiment, the at least one separation monitoring device is connected to at least a portion of at least one of a wing and a horizontal stabilizer of an aircraft, wherein the at least one separation monitoring device transmits and receives signals both vertically and substantially perpendicularly to at least one of the wing and the horizontal stabilizer and outputs a separation distance signal.

In accordance with the present invention, each wing, each horizontal stabilizer, each vertical stabilizer, at least a portion of a fuselage of an aircraft, and/or a tug/vehicle comprise at least one separation monitoring device.

In yet another embodiment, when at least one of the wings of the aircraft are within a predetermined distance away from an object, the master unit communicates a warning to an individual so as to prevent collisions between at least one of the wings of the aircraft and an object.

In one embodiment of the present invention the warning device comprises a speaker capable of communicating an audible warning when the warning device receives warning signals from the master unit.

In yet another embodiment, when the separation distance between the separation monitoring device and the object decreases the audible warning increases in decibel level.

In another embodiment, the warning device of the master unit comprises a visual display communicating a visible warning.

In accordance with the present invention, the visual display comprises a plurality of light emitting diodes which are illuminated when the master unit communicates a warning signal to the warning device.

In a preferred embodiment, the master unit is in electrical communication with a vehicle utilized to translate the aircraft.

In yet another embodiment, when the at least one transceiver is within a collision distance the master unit automatically stops the vehicle.

In another embodiment, the master unit comprises a communicator device selected from the group consisting of: a personal digital assistant, a cellular telephone, or a global positioning device.

In accordance with the present invention, the at least one separation monitoring device and the master unit communicate wirelessly via at least one wireless communication protocol, wherein the at least one communication protocol is selected from the group consisting of: infrared, bluetooth, radio frequencies or Wi-Fi.

In one embodiment, the present invention is directed to an aircraft collision avoidance system for monitoring the position of at least a portion of an aircraft relative to an object, the system comprising: (a) at least one separation monitoring device connected to at least a portion the aircraft, the separation monitoring device comprising: (1) at least one transceiver, the transceiver capable of transmitting signals and receiving signals which are reflected back to the transceiver off of at least a portion of the object to define a separation distance and wherein the at least one transceiver wirelessly outputs a separation distance signal; and (b) a master unit for receiving and analyzing the separation distance signals output by the at least one transceiver and outputting a warning signal to a warning device when the at least one transceiver is within a predetermined distance from the object.

In another embodiment of the present invention, the object is a door of a hangar.

In yet another embodiment of the present invention, the object is another aircraft.

In accordance with the present invention, each wing and each horizontal stabilizer and at least a portion of a fuselage of an aircraft comprise at least one separation monitoring device.

In yet another embodiment, the master unit is electrical communication with a vehicle utilized to move or displace the aircraft.

In accordance with the present invention, when the at least one transceiver is within a collision distance the master unit automatically stops the vehicle.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

The invention will now be described with reference to the drawings wherein.

DETAILED DESCRIPTION OF THE INVENTION

Figure 1:
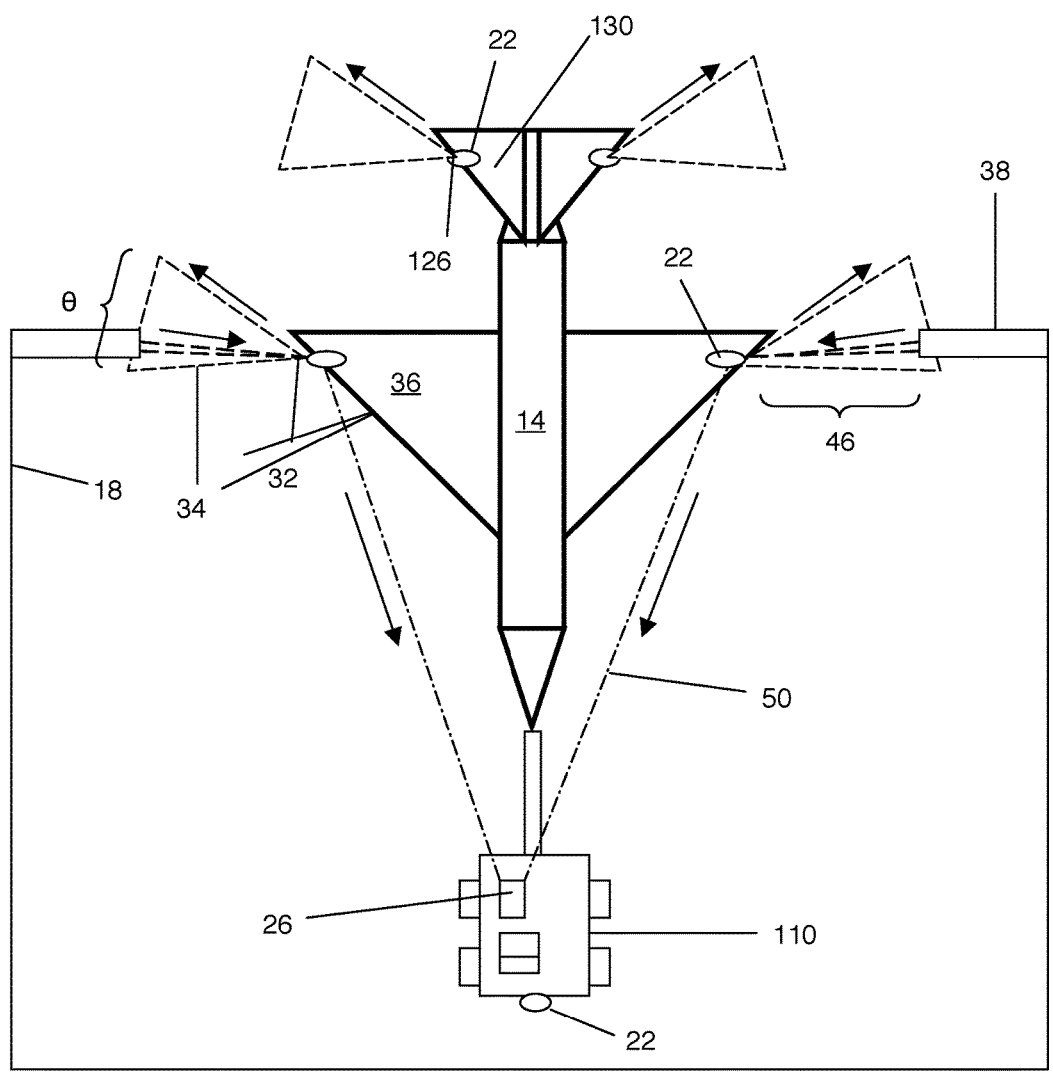
FIG. 1 of the drawings is top plan view of an aircraft disposed within a hangar, the aircraft having a plurality of separation monitoring devices, in accordance with the present invention.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Figure 2:
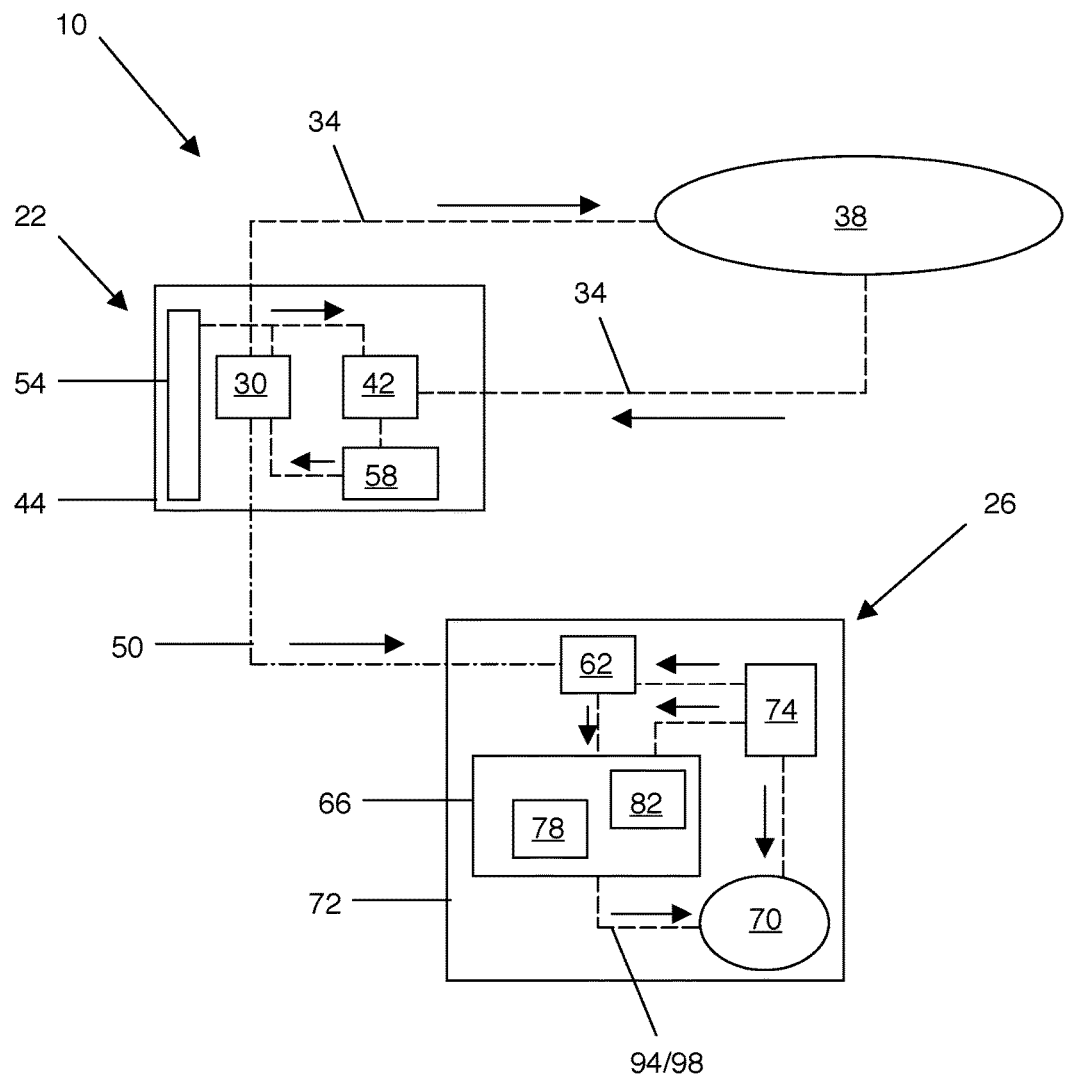
FIG. 2 of the drawings is schematic representation of an aircraft collision avoidance system, in accordance with the present invention.

Referring now to the drawings and to FIGS. 1 and 2 collectively, an aircraft collision avoidance system 10 is shown in association with an aircraft 14 located in a hangar 18. Generally, the arrows shown in FIGS. 1 and 2 represent the direction of signal transmission although some devices may be capable of two-way communication. More specifically, the aircraft collision avoidance system 10 comprises at least one separation monitoring device 22 and a master unit 26. The separation monitoring device or distance measuring sensor 22 comprises at least one transmitter 30 which is capable of transmitting a signal 34 (e.g. an ultrasonic signal). When the signal 34 is reflected off of an object, for example, a hangar door 38, the signal 34 is then received by a receiver 42. The signal 34 may be transmitted in a substantially arcuate pattern covering an arc having an angle of θ degrees. The angle of θ degrees may preferably cover an area, which is at least as wide as the terminal end 32 of the wing 36 of the aircraft 14. The distance between the hangar door 38 and the receiver 42 is known as a separation distance 46. The transmitter 30 then outputs a separation distance signal 50 that includes data representative of the separation distance 46.

Figure 4:
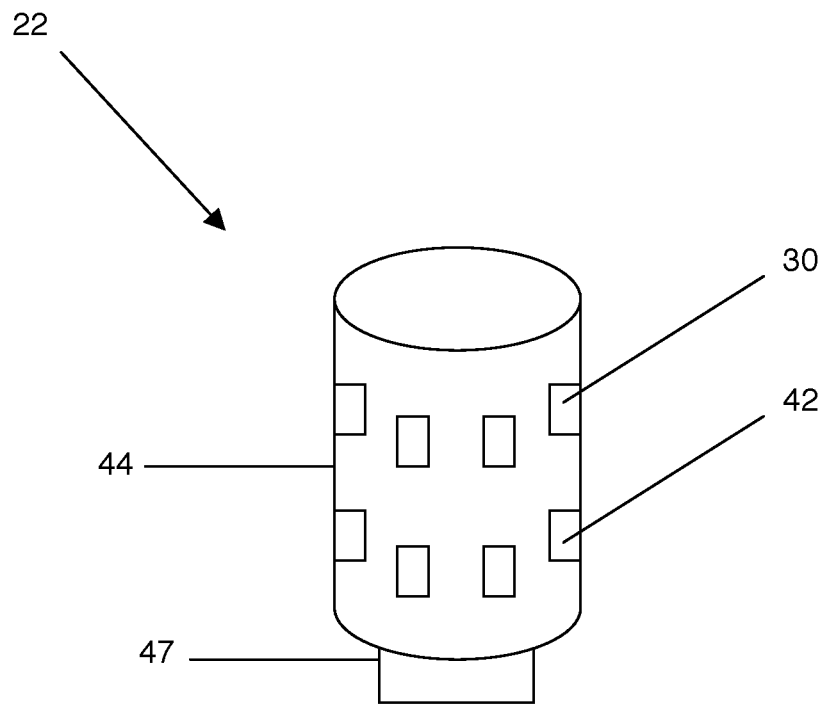
FIG. 4 of the drawings is a perspective view of a separation monitoring device of an aircraft collision avoidance system, in accordance with the present invention.

It will be understood that the separation monitoring device 22 may comprise a plurality of transmitters 30 and receivers 42 to cover a larger area. Furthermore, the separation monitoring device may comprise a plurality of transmitters 30 and/or receivers 42 that cooperatively validate a signal to minimize and/or avoid false positive and/or negative indications. The separation monitoring device 22 preferably comprises a housing 44 for enclosing the aforementioned parts 30 and 42. The housing 44 is preferably fabricated from any one of a number of materials, including, but not limited to, a resin and/or polymer, a metal or alloy, a fiberglass material, a natural product such as wood, or any combinations thereof. The separation monitoring device 22 also preferably comprises a releasable securement member 47 (see FIG. 4) for connecting the housing 44 to at least a portion of an aircraft 14 and/or vehicle 110. The releasable securement member 47 may include, for example, a suction cup (e.g., ram suction cup mount), or a removable adhesive disposed between the housing 44 and the aircraft 14.

The separation monitoring device 22 further comprises a microprocessor 54 for controlling the transmitter 30 and receiver 42 and an energy storage device 58 (e.g. a primary and/or secondary battery). The energy storage device 58 provides electrical energy to the separation monitoring device 22.

In accordance with the present invention, the separation monitoring device 22 may be non-integrated (e.g., separate and/or removable) from the aircraft 14 and/or the vehicle 110, or, alternatively, the separation monitoring device 22 may be integrated (e.g., built in yet removable and/or non-removable) from the aircraft 14 and/or the vehicle 110.

In one embodiment of the present invention, the separation monitoring device 22 further comprises an image sensor for providing a user with an image (e.g., a photo, a video) associated with one or more separation monitoring devices. Examples of suitable image sensors include video camera tubes, semiconductor charge-coupled devices (CCD), active pixel sensor in complementary metal-oxide-semiconductors (CMOS), N-type metal-oxide-semiconductors (NMOS, Live MOS), and back-side illuminated complementary metal-oxide-semiconductors (BSI-CMOS).

It will be understood that the above-identified image sensors are commercially available from a plurality of sources, including Agilent, Aptina, Canesta, Canon, Caeleste, CMOSIS, Dalsa, Eastman Kodak, ESS Technology, Fujifilm, MagnaChip, Matsushita, MAZeT GmbH, Mitsubishi, Nikon OmniVision Technologies, ON Semiconductor, Cypress Semiconductor, PixArt Imaging, Pixim, Samsung, Sharp, Sony, STMicroelectronics, Toshiba, TowerJazz, Town Line Technologies, TransChip, Trusight and Trusense Imaging—just to name a few suppliers.

Additional examples of suitable image sensors for use in accordance with the present invention include U.S. Pat. No. 6,359,323 B1 entitled "Color image sensor and method for fabricating the same," United States Patent Application Publication No. 2006/0043261 A1 entitled "Solid state image pickup device and image pickup system comprising it," U.S. Pat. No. 7,129,979 B1 entitled "Image sensor pixel for global electronic shuttering," United States Patent Application Publication No. 2004/0147059 A1 entitled "Method for manufacturing CMOS image sensor having microlens therein with high photosensitivity," U.S. Pat. No. 5,990,506 A entitled "Active pixel sensors with substantially planarized color filtering elements," U.S. Pat. No. 6,235,549 B1 entitled "Method and apparatus for employing a light shield to modulate pixel color responsivity," U.S. Pat. No. 6,765,276 B2 entitled "Bottom antireflection coating color filter process for fabricating solid state image sensors," U.S. Pat. No. 6,486,913 B1 entitled "Pixel array with shared reset circuitry," U.S. Pat. No. 6,872,584 B2 entitled "Solid state image sensor and method for fabricating the same," United Stated Patent Application Publication No. 2006/0011813 A1 entitled "Image sensor having a passivation layer exposing at least a main pixel array region and methods of fabricating the same," United States Patent Application Publication No. 2007/0187793 A1 entitled "Filter, color filter array, method of manufacturing the color filter array, and image sensor," U.S. Pat. No. 6,379,992 B2 entitled "Method for fabricating an image sensor," United States Patent Application Publication No. 2006/0138500 A1 entitled "CMOS image sensor and method for fabricating the same," United States Patent Application Publication No. 2005/0263839 A1 entitled "Photoelectric converting film stack type solid-state image pickup device, and method of producing the same," United States Patent Application Publication No. 2007/0090274 A1 entitled "Image sensors including active pixel sensor arrays," United States Patent Application Publication No. 2006/0157761 A1 entitled "Image sensor with self-boosting and methods of operating and fabricating the same," U.S. Pat. No. 6,369,417 B1 entitled "CMOS image sensor and method for fabricating the same," U.S. Pat. No. 6,127,668 A entitled "Solid state image pickup device and method for manufacturing the same," United States Patent Application Publication No. 2007/0023802 A1 entitled "CMOS image sensor and method of fabricating the same," United States Patent Application Publication No. 2005/0090035 A1 entitled "Method for fabricating CMOS image sensor protecting low temperature oxide delamination," and United States Patent Application Publication No. 2006/0261342 A1 entitled "Imaging device having a pixel cell with a transparent conductive interconnect line and the method of making the pixel cell"—all of which are hereby incorporated herein by reference in their entirety, including all references cited therein.

In another embodiment of the present invention, the separation monitoring device 22 further comprises a microwave and/or radar transmitter and receiver, in addition to, or in replacement of a sound wave transmitter (e.g., ultrasonic). It will be understood that such a transmitter may be configured in a manner consistent with U.S. Pat. No. 3,733,604 entitled "A Aircraft guidance system," U.S. Pat. No. 3,739,379 A entitled "Coherent pulse doppler altimeter," U.S. Pat. No. 3,579,238 A entitled "Automatic power control of a pulse modulator," German Patent No. DE 2,312,145 A1 entitled "Method and apparatus for distance measurement using microwaves," U.S. Pat. No. 4,044,354 A entitled "Distance measurement using microwaves," U.S. Pat. No. 3,985,030 A entitled "Ultrasonic acoustic pulse echo ranging system," U.S. Pat. No. 4,336,538 A entitled "Radar systems," U.S. Pat. No. 4,319,246 A entitled "Radar systems," U.S. Pat. No. 4,225,866 A entitled "Automatic failure-resistant radar transmitter," U.S. Pat. No. 4,805,453 A entitled "Tank sonic gauging system and methods," U.S. Pat. No. 4,727,311 A entitled "Microwave moisture measurement using two microwave signals of different frequency and phase shift determination," U.S. Pat. No. 6,130,636 A entitled "Continuous wave radar system," U.S. Pat. No. 5,898,401 A entitled "Continuous wave radar altimeter," and U.S. Pat. No. 4,758,839 A entitled "Terrain profile radar system"—all of which are hereby incorporated herein by reference in their entirety, including all references cited therein.

In one embodiment of the present invention, the master unit 26 is in communication with the image sensor. In particular, the master unit 26 preferably displays the image provided by the image sensor using, for example a passive matrix and/or active matrix display.

The master unit 26 generally comprises a receiver 62, a computer unit 66, a warning device 70 and an energy storage device 74. The master unit preferably comprises a housing 72 for enclosing the aforementioned parts 62, 66, 70 and 74. The housing 72 is preferably fabricated from any one of a number of materials, including, but not limited to a resin and/or polymer, a metal or alloy, a fiberglass material, a natural product such as wood, or any combinations thereof.

The receiver 62 is preferably provided to receive separation distance signals 50 communicated by the transmitter 30 of the separation monitoring device 22 and communicate the separation distance signals 50 to the computer unit 66. The computer unit 66 is shown as preferably comprising the same components as a typical computer, for example, a memory 78 and a processing unit 82. The computer unit 66 is programmed to analyze the separation distance signals 50 and compare them to at least one of a predetermined distance and a collision distance stored within the memory 78 of the computer unit 66. When the computer unit 66 determines that the separation monitoring device 22 is within the predetermined distance, the computer unit 66 communicates a warning signal 94 to the warning device 70. The predetermined distance may be selectable by utilizing an optional interface 80 located on the master unit 26. Also, the predetermined distance and collision distances may be hard coded into the master unit 26 and stored in the memory 78. By way of non-limiting example, the predetermined distance may include distance of, for example, one meter. When the separation monitoring device 22 is within one meter of the hangar door 38 or any other object, the master unit outputs a warning signal 94 to the warning device 70. It will be understood that the predetermined distance may include, for example, one meter, although any distance or range of distances may be utilized. The collision distance is preferably defined as a distance at which there is a material possibility of a collision, such as, for example, six inches. When the computer unit 66 determines that the separation monitoring device 22 is within the collision distance, the computer unit 66 communicates a collision signal 98 to the warning device 70.

Figure 5:
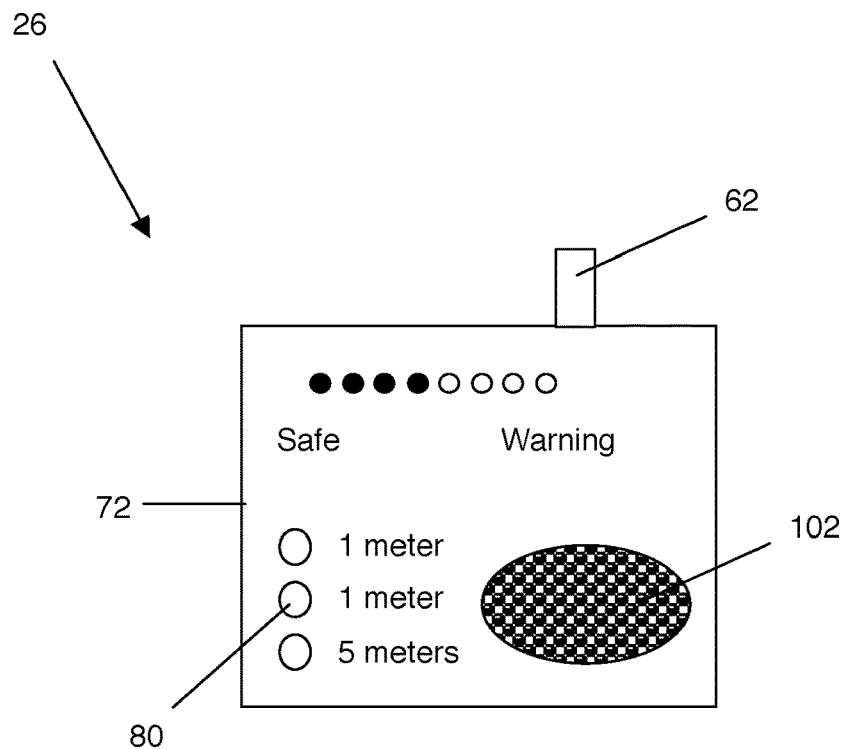
FIG. 5 of the drawings is a perspective view of a master unit of an aircraft collision avoidance system, in accordance with the present invention.

The warning device 70 comprises, for example an audio device which preferably comprises a speaker 102 (see FIG. 5) that communicates an audible warning at a sufficient frequency and decibel level so as to alert an individual of an impending collision. Also, the warning device 70 may communicate an increasing or decreasing audible warning depending on the separation distance 46 that is communicated to the master unit 26. For example, as the separation distance 46 decreases, the volume of the audio warning from the warning device 70 will preferably increase in decibel level.

The warning device 70 may also preferably comprise a visual display 106 comprising a plurality of light emitting diodes that illuminate to alert an individual of an impending collision. The greater the number of light emitting diodes that are illuminated, the greater the risk of a collision. Other visual displays may include, but are not limited to, a closed circuit video display. Also, as with the separation monitoring device 22, to power all the constituent parts of the master unit 26, the energy storage device 98, for example, a battery, communicates electrical energy to the master unit 26.

Figure 3:
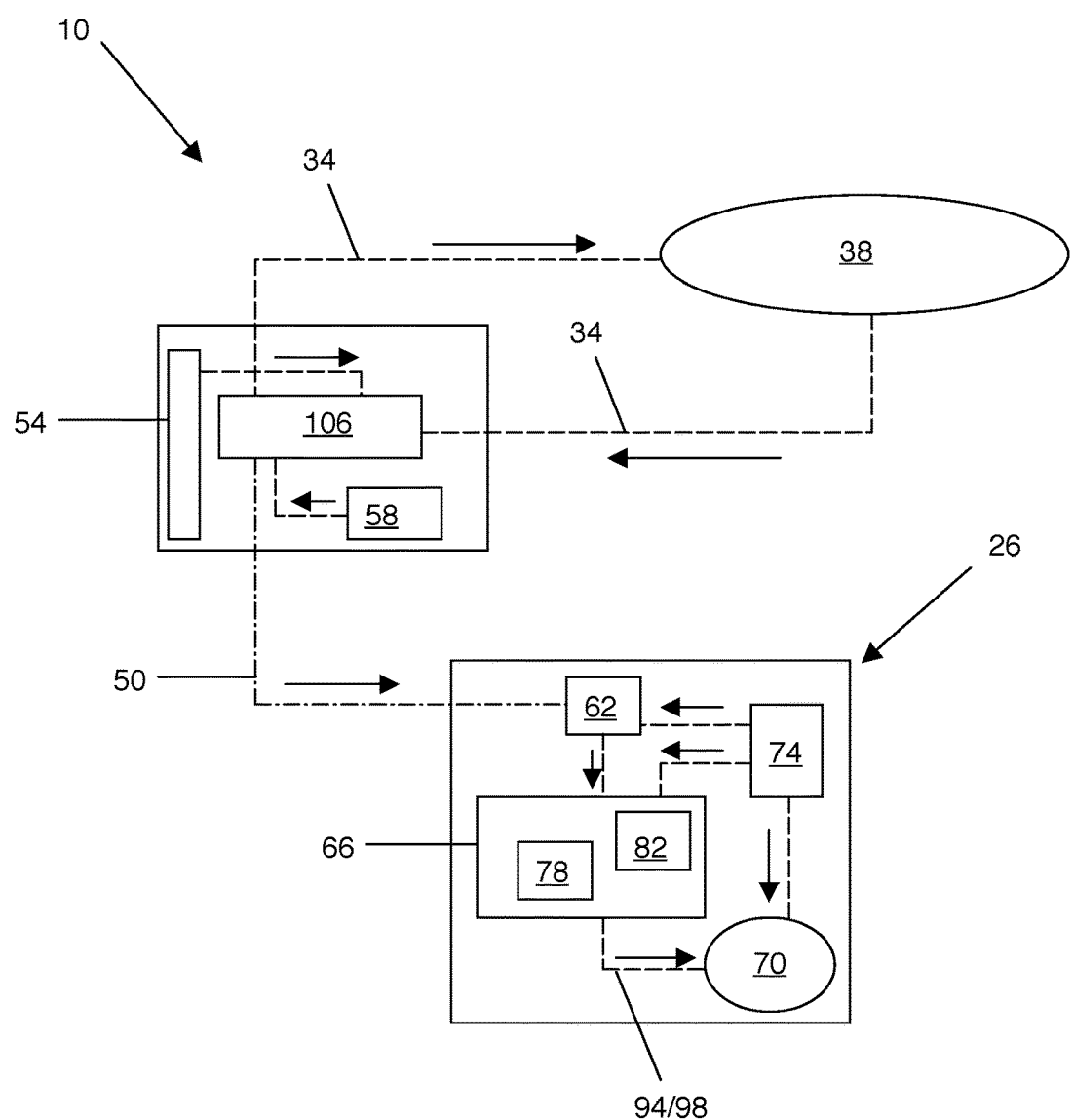
FIG. 3 of the drawings is schematic representation of an alternate embodiment of an aircraft collision avoidance system, in accordance with the present invention.

In another embodiment of the present invention, the separation monitoring device 22 may comprise a transceiver 106 (see FIG. 3) or plurality of transceivers which both transmit and receive signals and output separation distance signals 50 representative of the separation distance 46 between, for example, the hangar door 38 and the separation monitoring device 22.

The master unit 26 may be connectable, either electrically and/or mechanically to a vehicle 110 and at least partially control the vehicle 110. The vehicle 110 is preferably used to push and/or pull the aircraft 14 out of the hangar 18. When the separation monitoring device 22 disposed on at least a portion of the aircraft 14 is within the collision distance, the warning device 70 communicates a stop signal to the vehicle 110 which causes the vehicle 110 to stop.

The master unit 26 may comprise, for example, a handheld unit, a personal digital assistant, a cellular telephone, and/or a laptop computer—although anyone of a number of types of communication devices capable of receiving signals from the separation monitoring device 22 and communicating a warning to an operator of the vehicle 110 that would be known to one of ordinary skill in the art with the present disclosure before them are likewise contemplated for use with the present invention. It will be understood that the master unit 26 may be fabricated as an integral part of the vehicle 110.

The master unit 26 may preferably communicate with the at least one separation monitoring device 22 via the receiver 62 over a variety of different wireless communication protocols, for example, Wi-Fi signals (e.g., 802.11n, 802.11b, 802.11g, etcetera), infrared signals, bluetooth signals, radio frequencies (e.g., 900 Mhz, 1.8 GHz, 2.4 GHz, etcetera) or combinations thereof.

If the separation monitoring device 22 communicates infrared signals, the receiver 62 of the master unit 26 should preferably comprise an infrared sensor. Likewise, if the separation monitoring device 22 communicates Bluetooth signals, the receiver 62 of the master unit 26 should preferably comprise a Bluetooth sensor. Furthermore, if the separation monitoring device 22 communicates radio frequency signals, the receiver 62 of the master unit 26 should preferably comprise a radio frequency antenna. Lastly, if the separation monitoring device 22 communicates Wi-Fi signals, the receiver 62 of the master unit 26 should preferably comprise a Wi-Fi antenna.

In operation, the plane 14 is provided with a plurality of separation monitoring devices 22. For example, in one embodiment, seven separation monitoring devices 22 are positioned on the aircraft (e.g., forward facing on the left wing, forward facing on the right wing, rearward facing on the left wing, rearward facing on the right wing, rearward facing on the vertical stabilizer, rearward facing on the left horizontal stabilizer, and rearward facing on the right horizontal stabilizer, etcetera) and one separation monitoring device 22 is positioned on the back of the vehicle or tug. In particular, each of the terminal ends 32 of the wings 36 of the aircraft 14 preferably comprise separation monitoring devices 22 connected thereto. Also, the terminal ends 126 of the horizontal stabilizers 130 preferably comprise separation monitoring devices 22 connected thereto. The separation monitoring devices 22 communicate signals 34 horizontally and substantially co-planar to the wings 36 and horizontal stabilizers 130, respectively. The signals 134 may be transmitted in an arcuate pattern covering an arc having an angle of θ degrees. The angle of θ degrees may preferably cover an area that is at least as wide as the terminal ends 32 of the wings 36 and the terminal ends 126 of the horizontal stabilizers 130 of the aircraft 14. The signals 34 reflect off of the hangar door 38 back towards the separation monitoring device 22 that transmitted the signal. If one of the separation monitoring devices 22 communicates a separation distance signal 50 that is analyzed by the master unit 26 and determined to be within the predetermined distance from the hangar door 38, the separation monitoring device 22 communicates a warning signal 94 to the master unit 26 associated with the vehicle 110. The master unit 26 displays a visual and/or audible warning to the operator of the vehicle 110 notifying them that the aircraft 14 is too close to the hangar door 38. If the operator ignores the visual and/or audible warning, and one of the separation monitoring devices 22 communicates a separation distance signal 50 that is analyzed by the master unit and determined to be within the collision distance, the master unit 26 sends an electrical signal to the vehicle 110 that preferably stops the vehicle 110.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. An aircraft collision avoidance system, comprising:
   at least one separation monitoring device connectable to at least a portion of an aircraft, the separation monitoring device comprising:
      a housing for containing at least one transmitter, at least one receiver, and an energy source, wherein the energy source is contained within the housing and provides energy to the at least one separation monitoring device;
      at least one transmitter capable of selectively transmitting signals which are reflected off of an object and received by at least one receiver, the reflected signals defining a separation distance between the at least one receiver and the object and wherein the at least one transmitter outputs a separation distance signal representative of the separation distance; and
      an image sensor, wherein the image sensor is at least partially positioned within the housing; and
   a master unit for receiving and analyzing the separation distance signals output by the at least one transmitter and outputting a warning signal to a warning device when the at least one separation monitoring device is within a predetermined distance from the object, and wherein the master unit displays an output signal from the image sensor.

2. The aircraft collision avoidance system according to claim 1, wherein a separation monitoring device is disposed on at least one of a wing and a horizontal stabilizer of an aircraft and the master unit communicates with the separation monitoring device to monitor the position of at least one of the wing and the horizontal stabilizer of the aircraft relative to an object.

3. The aircraft collision avoidance system according to claim 1, wherein the at least one separation monitoring device is connected to at least a portion of at least one of a wing and a horizontal stabilizer of an aircraft, wherein the at least one separation monitoring device transmits signals in an arcuate pattern both horizontally and substantially co-planar to at least one of the wing and the horizontal stabilizer and receives signals reflected off of an object and outputs a separation distance signal representing the separation distance between the object and the at least one separation monitoring device.

4. The aircraft collision avoidance system according to claim 1, wherein the at least one separation monitoring device is connected to at least a portion of at least one of a wing and a horizontal stabilizer of an aircraft, wherein the at least one separation monitoring device transmits and receives signals both vertically and substantially perpendicularly to at least one of the wing and the horizontal stabilizer and outputs a separation distance signal.

5. The aircraft collision avoidance system according to claim 1, wherein each wing, each horizontal stabilizer and at least a portion of a fuselage of an aircraft comprise at least one separation monitoring device.

6. The aircraft collision avoidance system according to claim 5, wherein when at least one of the wings of the aircraft are within a predetermined distance away from an object, the master unit communicates a warning to an individual so as to prevent collisions between at least one of the wings of the aircraft and an object.

7. The aircraft collision avoidance system according to claim 1, wherein the warning device comprises a speaker capable of communicating an audible warning when the warning device receives warning signals from the master unit.

8. The aircraft collision avoidance system according to claim 7, wherein when the separation distance between the separation monitoring device and the object decreases the audible warning increases in decibel level.

9. The aircraft collision avoidance system according to claim 1, wherein the warning device of the master unit comprises a visual display communicating a visible warning.

10. The aircraft collision avoidance system according to claim 9, wherein the visual display comprises a plurality of light emitting diodes which are illuminated when the master unit communicates a warning signal to the warning device.

11. The aircraft collision avoidance system according to claim 1, wherein the master unit is in electrical communication with a vehicle utilized to translate the aircraft.

12. The aircraft collision avoidance system according to claim 11, wherein when the at least one separation monitoring device is within a collision distance the master unit automatically stops the vehicle.

13. The aircraft collision avoidance system according to claim 1, wherein the master unit comprises a communicator device selected from the group consisting of: a personal digital assistant, a cellular telephone, a laptop, or a global positioning device.

14. The aircraft collision avoidance system according to claim 1, wherein the at least one separation monitoring device and the master unit communicate wirelessly via at least one wireless communication protocol, wherein the at least one communication protocol is selected from the group consisting of: Infrared, Bluetooth, Radio Frequencies or Wi-Fi.

15. An aircraft collision avoidance system, comprising:
   at least one wireless transceiver capable of selectively transmitting signals and receiving signals which are reflected back to the wireless transceiver off of an object in order to define a separation distance between the wireless transceiver and the object and wherein the wireless transceiver outputs a separation distance signal representative of the separation distance, and a housing for containing at least one transceiver, and an energy source, wherein the energy source is contained within the housing and provides energy to the at least one separation monitoring device;
   an image sensor, wherein the image sensor is at least partially positioned within the housing; and
   a master unit for receiving and analyzing the separation distance signals output by the wireless transceiver, the master unit outputting a warning signal to a warning device when the wireless transceiver is within a predetermined distance from an object, and wherein the master unit displays an output signal from the image sensor.

16. An aircraft collision avoidance system, comprising:
   at least one separation monitoring device connectable to at least a portion of an aircraft, the separation monitoring device comprising:
      a housing for containing at least one sound transmitter, at least one radar transmitter, and an energy source, wherein the energy source is contained within the housing and provides energy to the at least one separation monitoring device;

at least one sound transmitter capable of selectively transmitting signals which are reflected off of an object and received by at least one receiver, the reflected signals defining a separation distance between the at least one receiver and the object and wherein the at least one transmitter outputs a separation distance signal representative of the separation distance;

at least one radar transmitter capable of selectively transmitting radar signals which are reflected off of an object and received by at least one receiver, the reflected signals defining a separation distance between the at least one receiver and the object and wherein the at least one transmitter outputs a separation distance signal representative of the separation distance;

an image sensor, wherein the image sensor is at least partially positioned within the housing; and a master unit for receiving and analyzing the separation distance signals output by the at least one sound transmitter and outputting a warning signal to a warning device when the at least one separation monitoring device is within a predetermined distance from the object, and wherein the master unit displays an output signal from the image sensor.

\* \* \* \* \*